UNITED STATES PATENT OFFICE.

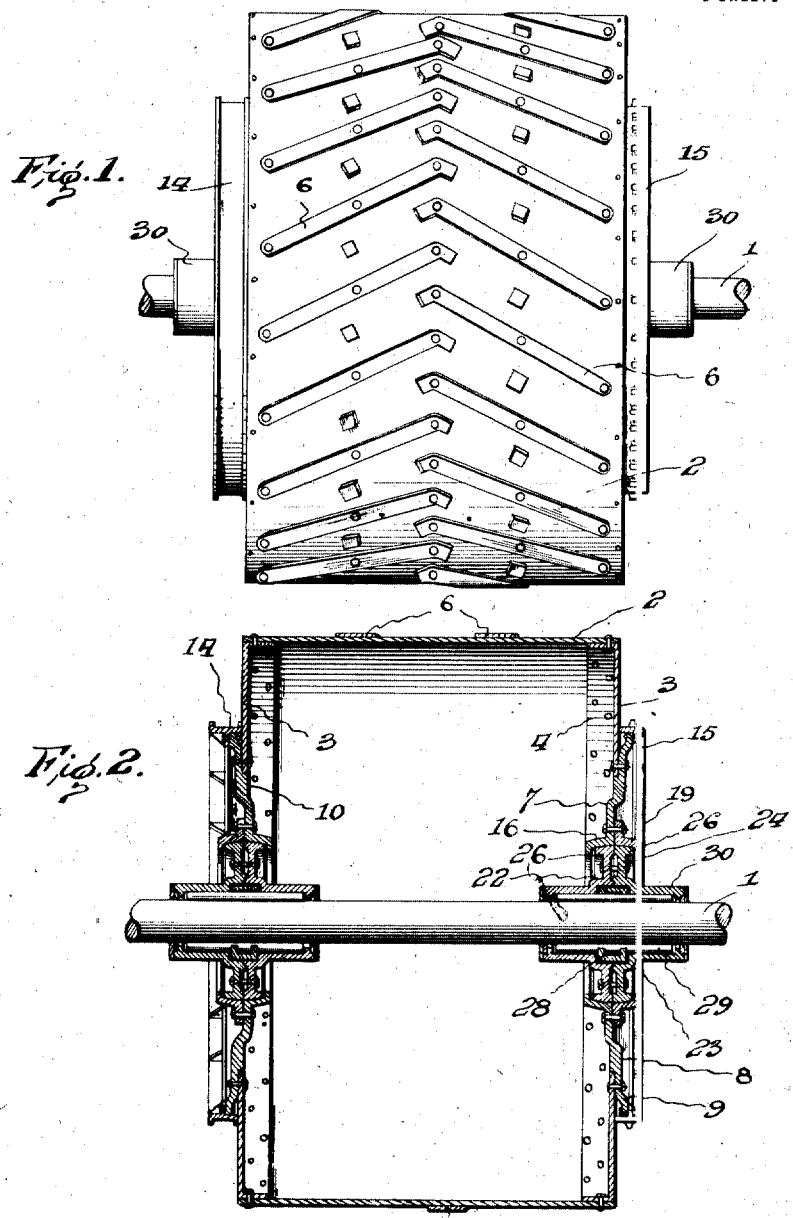

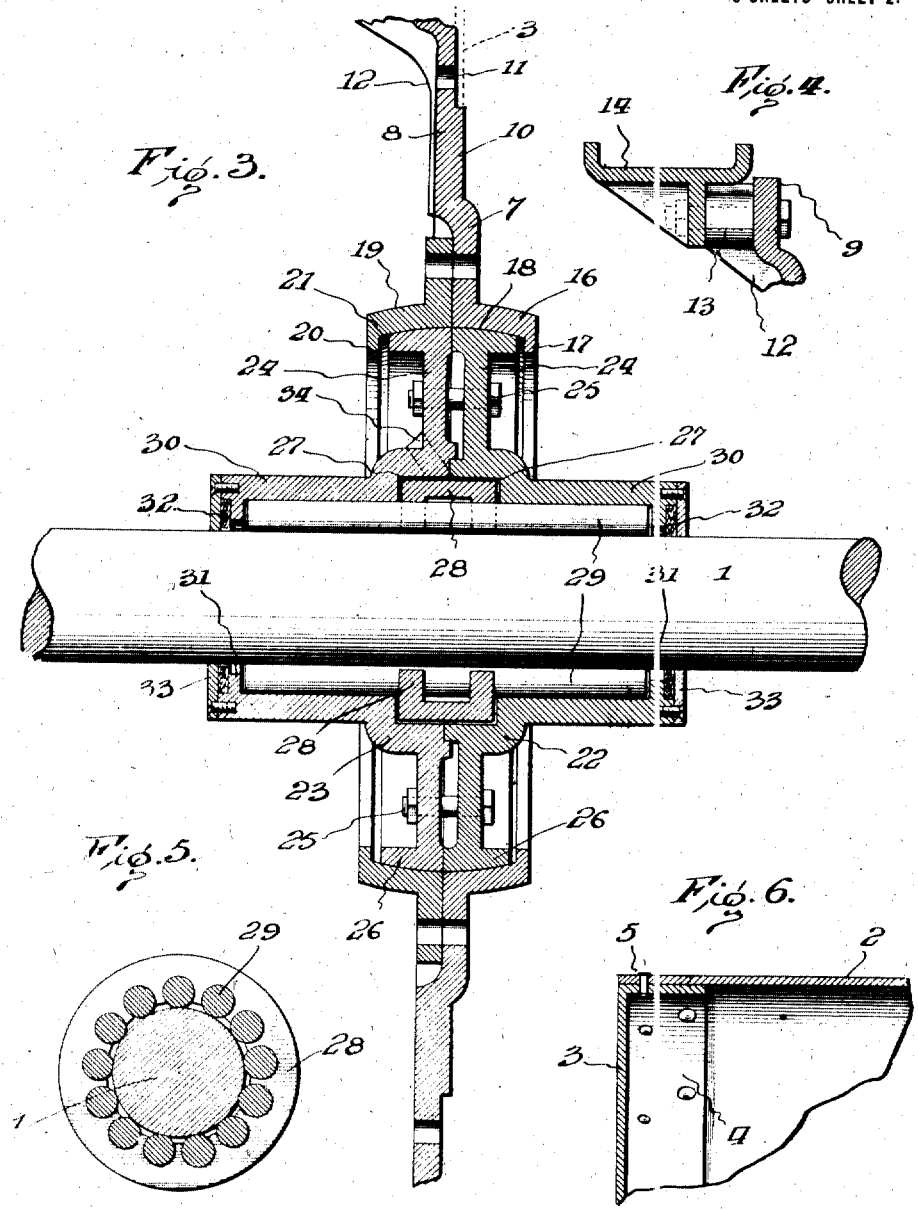

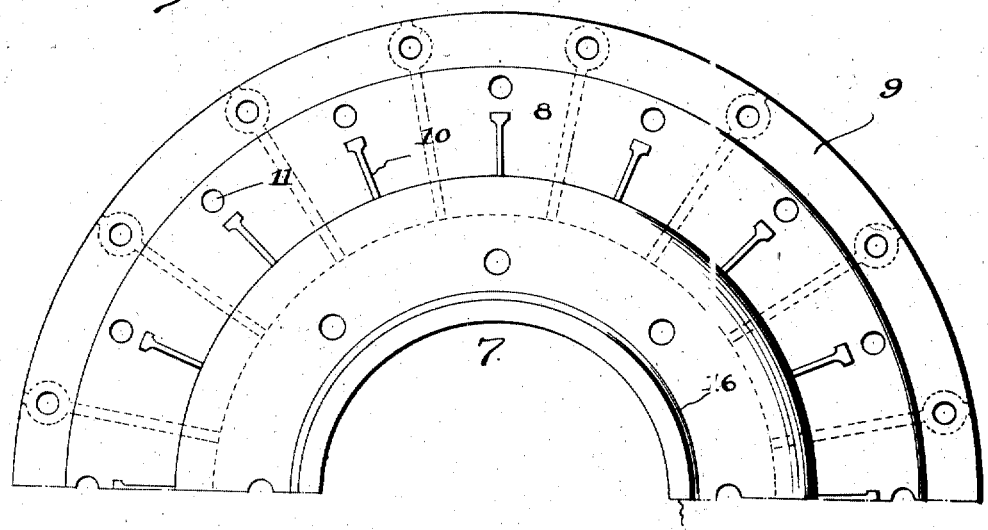
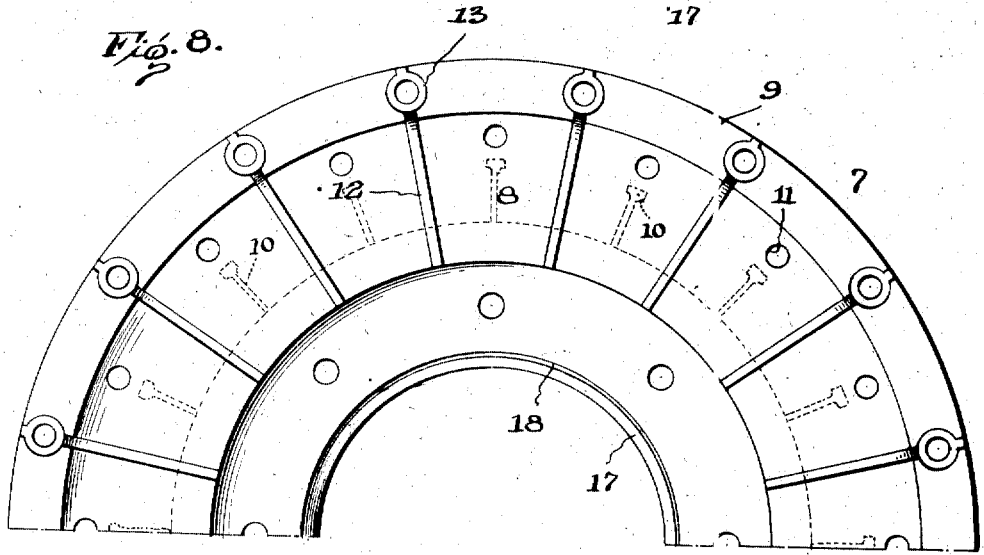

OLIVER W. JOHNSON, OF CLEVELAND, OHIO.

TRACTOR DRIVE-WHEEL AND MOUNTING FOR SAME.

1,219,323.   Specification of Letters Patent.   Patented Mar. 13, 1917.

Application filed March 29, 1916. Serial No. 87,604.

*To all whom it may concern:*

Be it known that I, OLIVER W. JOHNSON, a citizen of the United States, residing at Cleveland, in the county of Cuyahoga and State of Ohio, have invented certain new and useful Improvements in Tractor Drive-Wheels and Mountings for Same, of which the following is a specification.

This invention relates to the driving wheels of tractors and has for its object the provision of a light and strong wheel which will permit the tractor to travel close to the ground and which will operate efficiently to utilize the power of the engine to propel the tractor. The present application includes subject-matter originally shown, described and claimed in an application for patent on tractors filed by me August 10, 1915, Serial No. 44,805.

The present invention seeks to provide a driving wheel which will be effectually closed against the entrance of mud or other foreign matter which would increase the dead weight of the machine, and also seeks to provide a driving wheel which will be so mounted upon a stationary or fixed axle that the machine may accommodate itself to torsional strains encountered during its travel and which tend to twist or bend the axle or cause warping of the wheel.

An object of the invention is to provide a novel bearing for the wheel which will not bind but will work freely at all times notwithstanding bending of the axle or the wheel.

The invention also seeks to provide a driving wheel which may be readily assembled with its bearings and easily fitted to the axle or carrying rod.

The invention is illustrated in the accompanying drawings and will be hereinafter fully described and particularly claimed.

In the drawings,—

Figure 1 is an elevation of a driving wheel embodying my present invention;

Fig. 2 is a longitudinal section of the same;

Fig. 3 is an enlarged longitudinal section of the bearing or mounting for the wheel;

Fig. 4 is an enlarged detail section showing the connection of the brake band to the wheel;

Fig. 5 is a transverse section through the bearing;

Fig. 6 is a detail view showing the construction whereby the shell of the wheel is connected to the head of the same;

Figs. 7 and 8 are elevations respectively of the inner and outer sides of the inner circular plate or head which carries the bearing for the wheel.

In the present drawings, the reference numeral 1 indicates an axle, shaft or rod which is secured rigidly in the frame of the tractor transversely of the same and upon which the driving wheels are mounted. Ordinarily a pair of driving wheels is provided for the tractor and each wheel consists of a cylindrical shell 2 formed from a metal plate rolled into tubular form and having its abutting ends welded together. Within the ends of this cylindrical shell are inserted head members 3 which consist of circular plates having central openings and provided with annular flanges or ribs 4 at their outer edges, the said ribs or flanges fitting snugly within the ends of the shell 2 and being secured thereto by rivets, as indicated most clearly at 5 in Fig. 6. Upon the outer surface of the shell 2, I secure a plurality of ribs 6 which are arranged in two series, each series extending around the periphery of one-half of the wheel and the ribs in each series being parallel, all of the ribs being disposed obliquely to the periphery and the inner ends of the ribs in the two series overlapping, as shown clearly in Fig. 1.

Within the central opening of the head or end plate 3, I fit an inner head or disk 7 which consists of a circular plate having a stepped or dished formation whereby an outer portion 8 of the plate may fit close against and be secured to the outer face of the head 3 and the outer edge portion 9 of the plate will be spaced slightly from the said head 3. Upon the inner surface of the portion 8 of this inner head or plate 7 are ribs or bosses 10 against which the inner annular edge of the head 3 may rest and suitable openings are provided above the said ribs or projections, as shown at 11, to receive rivets or bolts by which the members 7 are secured to the heads 3. Upon the outer face of the inner heads 7 are formed radial ribs or reinforcements 12 which extend to the outer edge of the said head and are laterally enlarged near their outer extremities, as shown at 13, to provide circular bosses surrounding and defining openings through the head which receive rivets whereby the brake drum 14 or the sprocket wheel 15 may be secured to the head. The inner central portion of the disk, plate or inner head 7 is offset or projected inwardly, as shown at 16, to provide a hub member or collar having a radial inwardly projecting annular flange or stop shoulder 17 and having a concave inner surface, as shown at 18. To the outer face of the central portion of the head 7, I secure an outer hub member or collar 19 which has a flange or shoulder 20, corresponding in all respects to the shoulder or flange 17, and also having a concave surface 21 which, when the members are secured together, forms a continuation of the concave surface 18. Within this hub portion, consisting of the members 16 and 19, is fitted a bearing casing comprising mating members 22 and 23 which are secured together by bolts or rivets 25 inserted through annular ribs 24, as shown. The casing members 22 and 23 are provided at the outer edges of their ribs 24 with laterally extending head or rim members 26 having convex outer surfaces conforming in curvature to and fitting against the concave surfaces 18 and 21 of the hub members, but the combined width of the members 26 is less than the distance between the flanges 17 and 20 so that the driving wheel will be permitted to oscillate upon the said rim members 26 until the shoulder 17 or 20 impinges against the outer edge of the adjacent rim member, the center of curvature of the said concave and convex surfaces being at the center of the rod or stationary axle 1. By this arrangement and construction I am enabled to overcome the lateral torsional strains to which the tractor is subjected when in use and thereby avoid binding of the wheel in the event of the axle or any part of the wheel being bent. The members 22—23 are provided at their centers with annular recesses 27 in their inner faces and in the said recesses is fitted a spacing ring 28 by which anti-friction rollers 29 are held in spaced relation around the axle or shaft 1. These rollers 29 are housed within laterally elongated portions 30 of the casing members 22—23 which elongated portions are axially alined and together form a sleeve or hub inclosing the axle and the bearing rollers. At the ends of the sleeve thus provided are annular radial flanges 31 which receive the end thrust of the rollers 29 and prevent the same moving longitudinally of the axle and escaping from the casing. In the ends of the sleeve at the outer faces of the flanges 31 are fiber washers 32 which serve to retain lubricant in the bearing sleeve and are held in place by caps 33 secured to the ends of the sleeve members, as clearly shown, and as will be readily understood. An oil duct 34 is provided in the outer bearing member 23 to facilitate the supplying of lubricant to the spacing ring 28 and the rollers 29.

It is thought that the advantages of my improved driving wheel will be readily understood from the foregoing description, taken in connection with the accompanying drawings. Power is applied to the wheel throught the sprocket wheel or gear 15 and the travel of the wheel may be arrested when desired by the application of a brake band to the brake drum 14. The construction disclosed herein permits me to use a very thin shell or cylinder for the wheel inasmuch as the ends of the shell are entirely closed and no mud, dirt or stones can work into the interior of the drum to add to the dead weight of the machine. The construction of the heads or ends of the wheel together with the provision of the ribs 6 upon the periphery of the wheel so thoroughly reinforces the structure that exceedingly thin and light material may be employed so that the weight of the wheels may be very materially reduced below the weight of wheels now commonly used. The rollers 29 permit the wheels to rotate very freely upon the axle and the peculiar construction of the casing which carries the rollers, and the inner heads or circular plates or disks in which said casing is mounted provides for ample lateral oscillation to accommodate the wheels to a bending of the axle under torsional strains and permit the wheels to run freely and without any binding although the thin heads or shell may be bent or warped. The construction and arrangement of the parts are simple and the wheels may be manufactured at a cost which is not prohibitive of their general adoption. The collar formed by the members 16 and 19 permits oscillation of the wheel in the vertical plane of the axle and also permits the wheel to rotate about the casing of the roller bearing should there be a sudden application of the power or a sudden increase in the load or strain. Breakage of the power-transmitting chains or other parts of the gearing is thereby avoided, and the binding ordinarily caused by warping or bending of the material is overcome.

In assembling the wheel, the ribs are first secured upon the shell and the stop lugs between the ribs also fastened in place, the rivets for the outer ends of the ribs being temporarily withheld. The heads 3 are then put in place and secured by rivets, some of the rivets also passing through and securing the outer ends of the ribs. The roller bearing and its casing may be fitted within the collar 16 and the collar 19 then secured to the plate or inner head 7 after which said plate or head may be secured to the head 3. The wheel will then be ready to slip onto the axle. The offset portion at the extreme outer edge of the plate 7 provides a space between the same and the head or end plate 3 to accommodate the heads of the rivets or bolts by which the driving gear or the brake band is secured in place. A particular advantage of the present invention lies in the fact that exceedingly thin material may be used for the cylindrical shell and the heads secured in the ends of the same. The ends are so effectually reinforced by the parts surrounding the bearing and the rim or shell so effectually reinforced by the ribs thereon, that I have reduced the weight of the wheel to nearly one-half the weight of the wheels now ordinarily used.

Having thus described the invention, what is claimed as new is:

1. A driving wheel for tractors consisting of a cylindrical shell, heads secured in the ends of said shell, and bearings at the centers of said heads having rotatable engagement with an axle and provided each with an annular extension to fit close to the inner periphery of the head and rock across the plane thereof.

2. In a driving wheel for tractors, the combination of a cylindrical shell, end plates secured in the ends of the said shell and having central openings, heads secured to said end plates and fitting within said central openings, and bearings mounted centrally in said heads to rotate about an axle, the heads and the bearings having relative rocking movement across the planes of the heads.

3. In a driving wheel for tractors, the combination of a cylindrical shell, heads secured in the ends of the shell and provided at their centers with axially extended hub members, a casing fitting within said hub members to oscillate axially therein and having central laterally extending sleeves, and bearings within said sleeves to rotate about an axle.

4. In a driving wheel for tractors, the combination of a cylindrical shell, end plates secured in the ends of said shell, heads secured to said end plates and having hub members projecting axially through the centers of the same, a bearing casing carried by said hub members and mounted to oscillate therein, and bearing rollers carried by said casing to encircle an axle.

5. In a tractor, the combination of a rigid axle, disks mounted for rotation upon the axle and having offset portions at their outer edges, heads secured to said disks adjacent said offset portions, operating members secured to said offset portions, and cylindrical shells secured to the outer edges of said heads.

6. The combination of an axle, disks mounted for rotation upon the axle and having offset portions at their outer edges, end plates secured to said disks adjacent said offset portions, operating members secured to said offset portions of the disks, and cylindrical shells secured to the outer edges of said end plates, the disks being provided at their inner edges with axially disposed bearing portions constructed to rotate about and oscillate on a hub.

7. The combination of a rigid axle, bearing sleeves fitted upon said axle and having annular projections provided with laterally expanded outer bearing portions convex in cross section, concave annular flanges fitting upon said convex portions, disks extending from said flanges, heads secured to said disks, and cylindrical shells secured to said heads.

8. A driving wheel consisting of a thin cylindrical shell, thin end plates secured rigidly in the ends of said shell, heads secured to said end plates and extending inwardly through the central openings of said end plates, and a bearing mounted centrally in each of said heads and adapted to fit around an axle, said bearing being free to rotate in the radial plane of the head and have a limited oscillatory movement in the axial plane thereof.

9. A traction wheel consisting of a cylindrical shell, annular end plates secured rigidly in the ends of the shell, heads secured to said end plates and having offset portions projecting through the central openings of the same and terminating in hub members having concave inner surfaces and stops at the inner edges of said surfaces, mating hub members secured to the outer faces of said offset portions and having concave inner surfaces and stops at the outer edges of said surfaces, alined bearing sleeves extending axially through the hub members and having annular ribs at their meeting ends and provided at the outer edges of said ribs with rim members fitting within the said mating hub members, and fastening devices inserted through said ribs.

In testimony whereof I affix my signature.

OLIVER W. JOHNSON. [L.s.]